United States Patent
Chandra et al.

(10) Patent No.: US 9,274,934 B2
(45) Date of Patent: **\*Mar. 1, 2016**

(54) SYSTEM AND METHOD FOR CREATING CHANGE-RESILIENT SCRIPTS

(71) Applicant: International Business Machines Corporation, Armonk, NY (US)

(72) Inventors: Satish Chandra, Palo Alto, CA (US); Yandrapally Rahulkrishna, Khammam (IN); Saurabh Sinha, Bangalore (IN); Suresh Thummalapenta, Bangalore (IN); Leigh A. Williamson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/533,461

(22) Filed: Nov. 5, 2014

(65) Prior Publication Data
US 2015/0242306 A1 Aug. 27, 2015

Related U.S. Application Data

(63) Continuation of application No. 14/188,718, filed on Feb. 25, 2014, now Pat. No. 9,075,918.

(51) Int. Cl.
G06F 9/44 (2006.01)
G06F 11/36 (2006.01)

(52) U.S. Cl.
CPC .......... *G06F 11/3684* (2013.01); *G06F 11/368* (2013.01); *G06F 11/3688* (2013.01); *G06F 11/3664* (2013.01); *G06F 11/3696* (2013.01)

(58) Field of Classification Search
CPC ............ G06F 11/3664; G06F 11/3684; G06F 11/3696
USPC .................................................. 717/124–125
See application file for complete search history.

(56) References Cited

U.S. PATENT DOCUMENTS 6,701,514 B1 * 3/2004 Haswell et al. ................ 717/115
8,001,468 B2 8/2011 Khaladkar et al.
(Continued)

OTHER PUBLICATIONS

Mesbah et al., "Automated Cross-Browser Compatibility Testing," ICSE '11, May 21-28, 2011, ACM, Waikiki, Honolulu, HI, USA.
(Continued)

*Primary Examiner* — Ryan Coyer
(74) *Attorney, Agent, or Firm* — Patricia B. Feighan; Edward Choi (57) ABSTRACT

A method for creating agnostic test automation script commands associated with a specified action and a user interface (UI) is provided. The method may include receiving a target element associated with the specified action. The method may also generate at least one anchor uniquely identifying the target element, wherein the target element is ambiguous. The method may further include generating an agnostic test automation script command based on the received target element and the at least one generated anchor. Additionally, the method may analyze, using the generated agnostic test automation script command, the at least one generated anchor to locate the target element within the user interface (UI), wherein the analyzing is based on an application on which the agnostic test automation script command is to be executed. The method may also include performing, using the generated agnostic test automation script command, the specified action on the located target element.

7 Claims, 6 Drawing Sheets

(56) References Cited

U.S. PATENT DOCUMENTS

| | | | |
|---|---|---|---|
| 8,060,791 B2 | 11/2011 | Hayutin | |
| 2004/0204894 A1* | 10/2004 | McGrath et al. | 702/119 |
| 2012/0102461 A1 | 4/2012 | Schwartz et al. | |
| 2012/0124495 A1 | 5/2012 | Amichai et al. | |
| 2013/0086560 A1 | 4/2013 | Shen et al. | |
| 2013/0097586 A1 | 4/2013 | Chandra et al. | |
| 2013/0159890 A1 | 6/2013 | Rossi | |
| 2014/0050321 A1* | 2/2014 | Albert et al. | 380/270 |

OTHER PUBLICATIONS

IBM, "A Relationship Based Automation Test Method", IP.com, Dec. 7, 2008, IPCOM000177239D, pp. 1-8.

IBM, "GUI automation test system: automatically generate efficient, accurate, robust test scripts for a web application", IP.com, Jan. 14, 2010, IPCOM000191746D, pp. 1-4.

Thummalapenta et al., "Efficient and Change-Resilient Test Automation: An Industrial Case Study", ICSE 2013, San Francisco, CA, USA, 2013 IEEE, pp. 1002-1011.

Pending U.S. Appl. No. 14/188,718, filed Feb. 25, 2014 entitled: "System and Method for Creating Change-Resilient Scripts".

IBM, "Automating Test Automation", http://researcher.watson.ibm.com/researcher/view_group.php?id=3613, accessed Nov. 5, 2014.

* cited by examiner

SYSTEM AND METHOD FOR CREATING CHANGE-RESILIENT SCRIPTS

CROSS REFERENCE

The present application is a continuation of and claims priority under 35 U.S.C. §120 of U.S. patent application Ser. No. 14/188,718 filed on Feb. 25, 2014, which is incorporated by reference in its entirety.

FIELD OF THE INVENTION

The present invention relates generally to the field of computing, and more particularly to web applications.

BACKGROUND

Modern web applications may display highly dynamic content. The content may be accessed via a variety of different browsers and platforms, including mobile devices. Furthermore, the content may evolve frequently in response to changing requirements, customer dynamics, and competitive pressures. As such, these factors may increase robustness requirements on web applications. Therefore, manual testing may be impractical and automated testing may be essential considering the short turn around time for upgrades and the plethora of browsers on which an application must be tested. However, these factors may also make automated testing difficult. For example, a test script automated on an application may easily break if the dynamic content of a page changes. Similarly, a script automated on one web browser may break when executed on a different browser or even a different browser version due to subtle differences in the browsers' Document Object Model (DOM) representations or page-rendering algorithms. The Document Object Model (DOM) is an application programming interface (API) for valid HTML and well-formed XML documents. The DOM defines the logical structure of documents and the way a document is accessed and manipulated.

Currently, web testing tools attempt to address the problems regarding automated testing. Some tools, rely on image-processing which makes the testing tools independent of DOM representations and, therefore, tolerant to variations in the representations. However, such tools may be ineffective when cross-browser differences result in different visual rendering of a web page. Additionally, such tools may not recognize that there is no functional change in the application when there is a simple change in the position of the elements of interest. Furthermore, some web testing tools rely on internal attributes and metadata, such as IDs of user interface elements that often change due to the dynamism of applications.

SUMMARY

A method for creating agnostic test automation script commands associated with a specified action and a user interface (UI) is provided. The method may include receiving a target element associated with the specified action. The method may also include generating at least one anchor uniquely identifying the target element, wherein the target element is ambiguous. The method may further include generating an agnostic test automation script command based on the received target element and the at least one generated anchor. Additionally, the method may include analyzing, using the generated agnostic test automation script command, the at least one generated anchor to locate the target element within the user interface (UI), wherein the analyzing is based on an application on which the agnostic test automation script command is to be executed. The method may also include performing, using the generated agnostic test automation script command, the specified action on the located target element.

A computer system for creating agnostic test automation script commands associated with a specified action and a user interface (UI) is provided. The computer system may include one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method. The method may include receiving a target element associated with the specified action. The method may also include generating at least one anchor uniquely identifying the target element, wherein the target element is ambiguous. The method may further include generating an agnostic test automation script command based on the received target element and the at least one generated anchor. Additionally, the method may include analyzing, using the generated agnostic test automation script command, the at least one generated anchor to locate the target element within the user interface (UI), wherein the analyzing is based on an application on which the agnostic test automation script command is to be executed. The method may also include performing, using the generated agnostic test automation script command, the specified action on the located target element.

A computer program product for creating agnostic test automation script commands associated with a specified action and a user interface (UI) is provided. The computer program product may include one or more computer-readable storage devices and program instructions stored on at least one of the one or more tangible storage devices, the program instructions executable by a processor. The computer program product may include program instructions to receive a target element associated with the specified action. The computer program product may also include program instructions to generate at least one anchor uniquely identifying the target element, wherein the target element is ambiguous. The computer program product may further include program instructions to select an agnostic test automation script command based on the received target element and the at least one generated anchor. Additionally, the computer program product may include program instructions to analyze, using the generated agnostic test automation script command, the at least one generated anchor to locate the target element within the user interface (UI), wherein the analyzing is based on an application on which the agnostic test automation script command is to be executed. The computer program product may also include program instructions to perform, using the generated agnostic test automation script command, the specified action on the located target element.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly to web applications. The following described exemplary embodiments provide a system, method and program product for creating change-resilient scripts that comprise agnostic test automation script commands.

As previously described with respect to automated testing of web applications, a test script automated on an application may easily break if the dynamic content, such as internal attributes of a page changes. Similarly, a script automated on one web browser may break when executed on a different browser or even a different browser version due to subtle differences in the browsers' internal representation of a webpage. Therefore, a script automated on one web browser may break when executed on a different browser or even a different browser version when the Document Object Model (DOM) representations for HTML pages or page-rendering algorithms change since automated scripts may rely on these structures for locating UI elements. For example, scripts may break even with minor application changes, such as changes in positions of UI elements and changes in the attributes of UI elements, such as ID or Src attributes. Because of the script-fragility problem, organizations may resort to manual testing. However, manual testing of web applications in the presence of multiple browsers may require additional effort compared to traditional testing using a single browser since all tests need to be repeated on each browser in each regression cycle of the application release.

Currently, web testing tools attempt to address the problems regarding automated testing. One category of tools, rely on image-processing which makes the testing tools independent of DOM representations and, therefore, tolerant to variations in the representations. However, such tools may be ineffective when cross-browser differences result in different visual rendering of a web page. Furthermore, such tools may require enough context to be captured surrounding the UI element of interest, when ambiguous elements are present, and as such any change in the context of the text may break the script. Additionally, such tools may not recognize that there is no functional change in the application when there is a simple change in the position of the elements of interest. Also, another category of web testing tools rely on internal attributes and metadata, such as the DOM structure, the DOM attributes or IDs of user interface elements that often change due to the dynamism of applications and leverage the internal attributes and metadata to playback the script. Therefore, the reliance on the internal attributes and metadata may make the script brittle in certain instances, such as for execution across browsers or in cases where the UI is generated dynamically. As such, it may be advantageous, among other things, to generate metadata-free and non-platform specific automated scripts in a manner that does not completely depend on internal attributes and yet is resilient to changes that make the current tools ineffective. As a result, the scripts may not break in the presence of changes in metadata and the scripts may be automated and seamlessly played back across various browsers and platforms in each regression cycle. Furthermore, the test scripts may not retain data about the underlying page structure. As such, the scripts may be independent of browser DOM structure and the scripts may not rely on the attributes of UI elements.

According to at least one embodiment of the present invention, a balance may be created between the usage of the internal structure (i.e., DOM representations) and the visual representation of a webpage. Since the web applications are designed with labels for human interaction, the primary form of visual representation does not change across browsers and releases. However, a webpage can often contain multiple user interface (UI) elements with the same labels. According to one implementation, an automation phase may construct the contextual visual clues for a UI element of interest. As such, any element of interest on a webpage may be associated with visual clues that are essential for human interaction. Therefore, the visual clues may be identified by analyzing the internal structure and attributes that define the appearance of elements on a webpage. Additionally, embodiments of the present invention may identify the clues that a human may use while executing a test step and identify the element of interest unambiguously. Then such clues may be used to generate a test script that may be played back at a later time. Although the clues may be constructed by leveraging the internal structure, no knowledge of the internal structure may be retained in the clues and the test scripts. Therefore, the test scripts may not retain any data about the underlying page structure. As such, the internal structure may evolve without introducing brittleness in the test script.

Additionally, according to at least one implementation, a playback phase may decode or "deconstruct" the visual clues on a given page without making any assumptions about the underlying structure. As such, elements of the present embodiment may analyze the Document Object Model (DOM) underlying a web page to generate visual clues for location a UI element unambiguously. Since the visual clues on the given internal representation may differ from the representation on which the clues were constructed, the playback may locate the element of interest again via an analysis of the internal structure. For example, during playback, the method may relocate the UI element of interest by decoding the clues on the given DOM (which may be on a different platform than the one on which the test was automated). According to at least one implementation, the present embodiment may be performed on tree-structured models, such as browser DOMs or any other UI model since the core algorithms may be agnostic to the model. Therefore, according to the present embodiments, if a recorded test is valid (i.e., the test steps may be executed by a human without adding, deleting or modifying steps), then the script may be played back.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for creating change-resilient scripts and cross-browser test automation that comprise. According to at least one implementation, the present embodiment presents a technique for inferring visual clues during automation for unambiguously locating a user interface (UI) element of interest. Additionally, the present embodiment may enrich existing plain-text test scripting languages by enabling them to express accurate visual clues in referring to UI elements. Furthermore, the present embodiment may present a playback algorithm for replaying a test case by translating plain-text visual clues to navigate to the UI element accurately, even in the presence of structural DOM differences and/or visual rendering differences.

Figure 1:
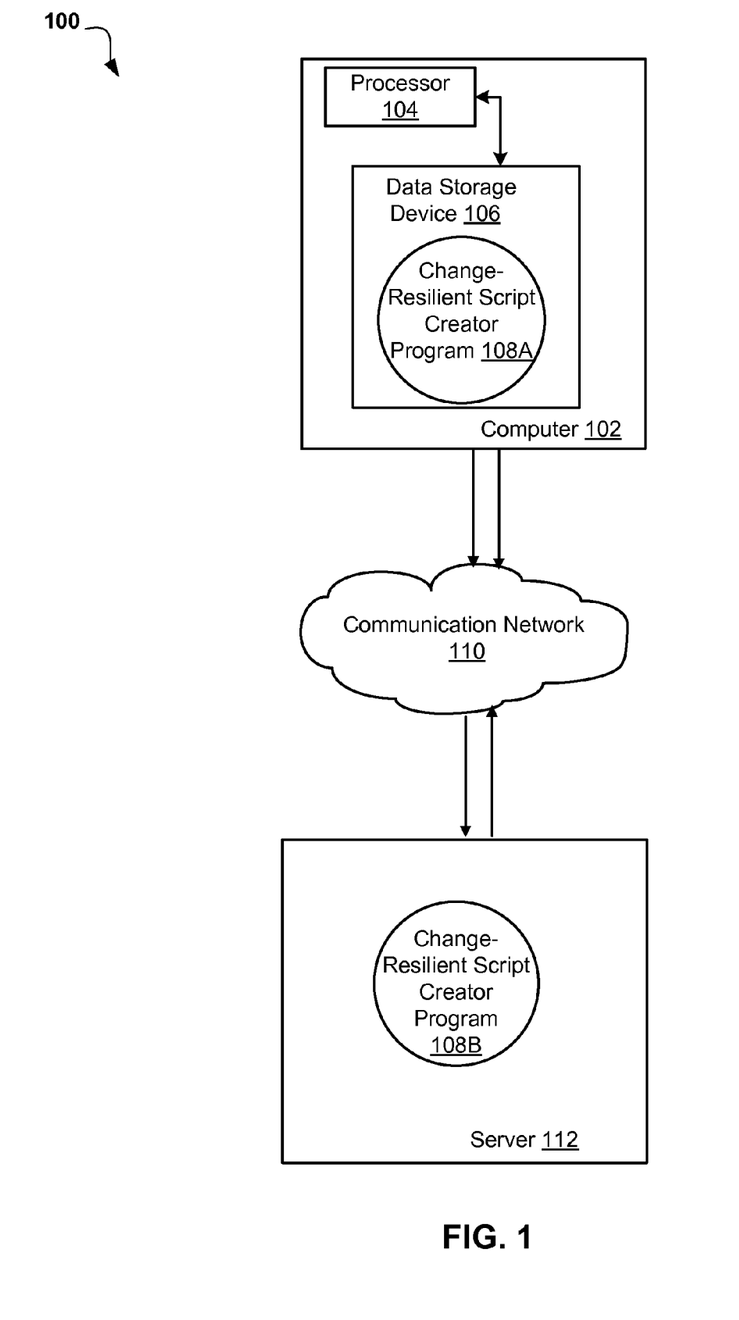
FIG. 1 illustrates a networked computer environment according to one embodiment.

Referring now to FIG. 1, an exemplary networked computer environment 100 in accordance with one embodiment is depicted. The networked computer environment 100 may include a computer 102 with a processor 104 and a data storage device 106 that is enabled to run a change-resilient script creator program 108A. The networked computer environment 100 may also include a server 112 that is enabled to run a change-resilient script creator program 108B and a communication network 110. The networked computer environment 100 may include a plurality of computers 102 and servers 112, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 6, server computer 112 may include internal components 800a and external components 900a, respectively and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing device capable of running a program and accessing a network.

A program, such as a change-resilient script creator program 108A and 108B may run on the client computer 102 or on the server computer 112. The change-resilient script creator program 108A, 108B may be create executable test scripts that exercise a web application through a set of intended test scenarios. For example, a user using a change-resilient script creator program 108A, running on a client computer 102 may connect via a communication network 110 to server computer 112 which may also be running a change-resilient script creator program 108B. Furthermore, the user using client computer 102 or server 112 may utilize the change-resilient script creator program 108A, 108B to create metadata-free automated test scripts that may be change-resilient and therefore, may not break in the presence of changes in metadata and may be seamlessly played back across different browsers and platforms. The change-resilient script creator method is explained in further detail below with respect to FIG. 3.

Figure 2:
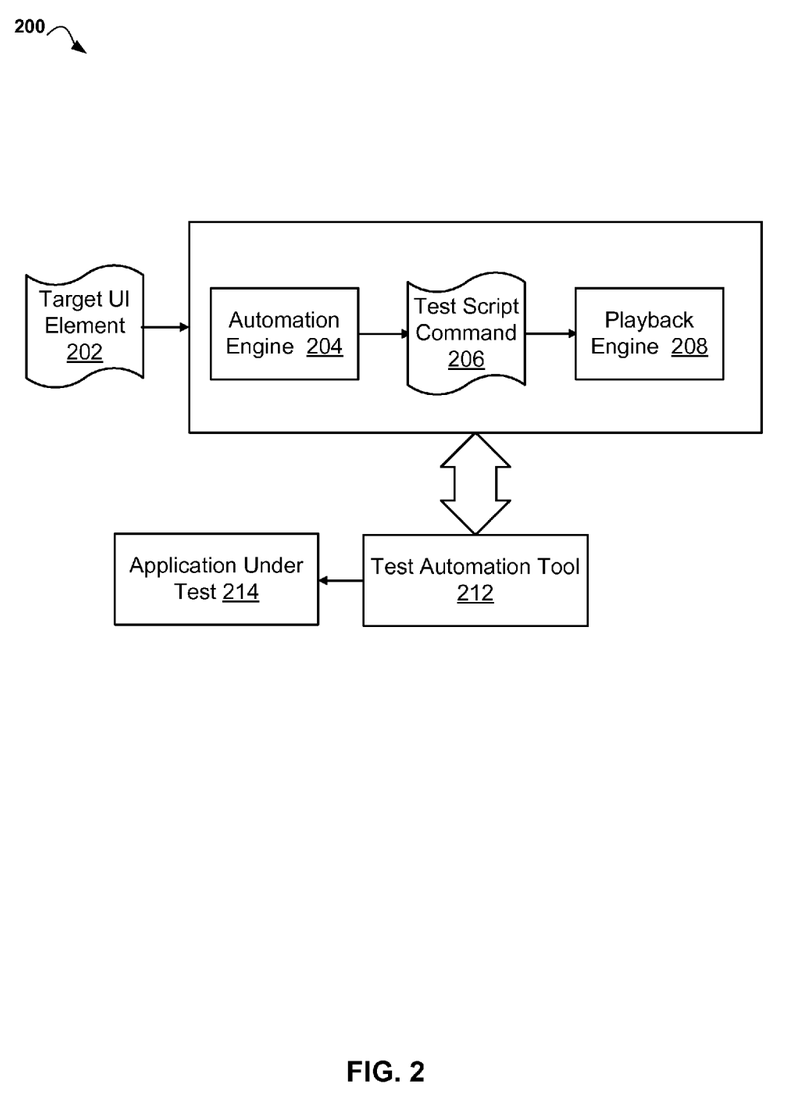
FIG. 2 illustrates a system architecture according to at least one embodiment.

Referring now to FIG. 2, a system architecture according to at least one embodiment is depicted. According to at least one implementation of the present embodiment, a target user interface (UI) element 202 may be specified by a user. The target user interface (UI) element 202 may be associated with a specified action and manipulated in a test step. An automation engine 204 may create a tool and platform agnostic test script command (i.e., agnostic test automation script command) 206 based on the given target UI element 202. The test script command 206 may be a command such as, "click on the link near "X", near "Y" and near "Z"", where "X", "Y" and "Z" may be individual contextual clues that uniquely identify the link. Then the playback engine 208 may automatically execute the test script command 206 via the test automation tool 212. According to one implementation, both the automation engine 204 and the playback engine 206 may interact with the application under test 214 via the test automation tool 212. Additionally, the method may not only be implemented on web applications, but may be implemented on any type of graphical user interface (GUI) system that can be represented in a tree-like data structure as well.

Figure 3:
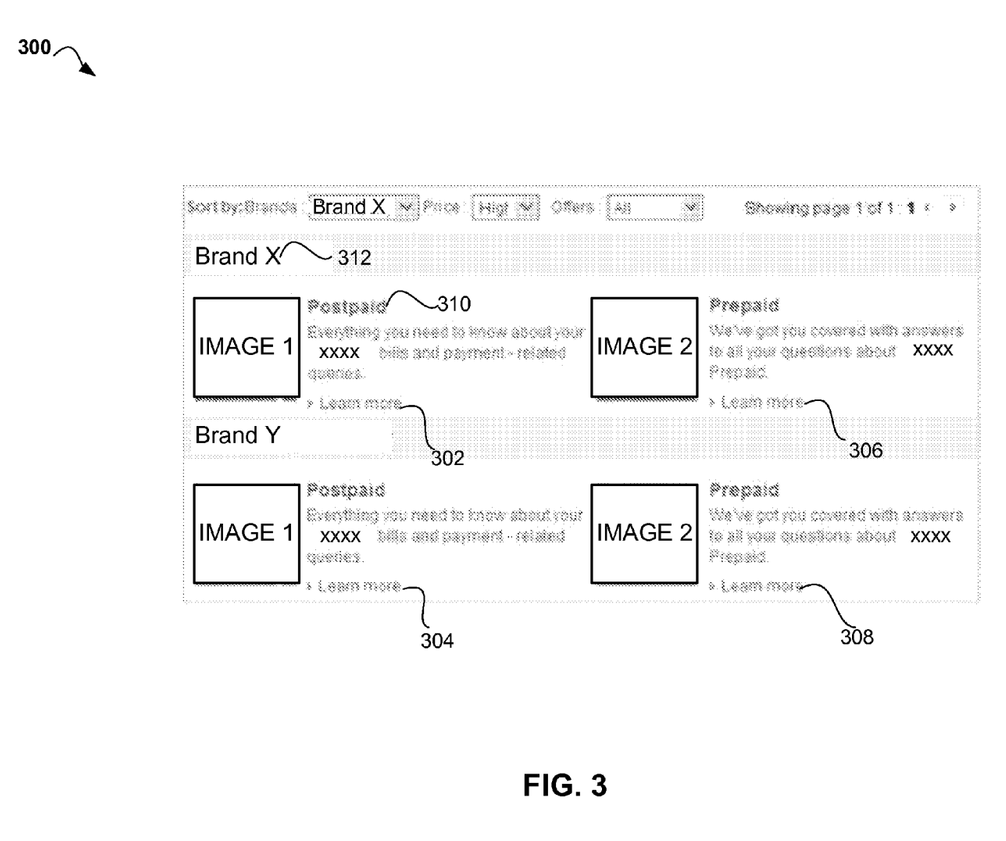
FIG. 3 illustrates an example of ambiguous user interface (UI) elements according to at least one embodiment.

Referring now to FIG. 3, an example illustrating an ambiguous user interface (UI) elements according to at least one embodiment is depicted. As shown in FIG. 3, there are four ambiguous instances of the target element "Learn more" 302-308. As such, each instance may require two anchors so that the target element may be identified unambiguously. An anchor may be a contextual visual clue, such as a text label or an image that unambiguously identifies a user-interface element (i.e., the target element). For example, the top left instance 302 may be identified by anchors "Postpaid" 310 and "Brand X" 312. For that instance, the agnostic script command is generated as "Click on 'Learn more' near 'Postpaid' near 'Brand X'". According to at least one implementation, the anchors that are necessary for locating the target element uniquely in a user interface may be computed. Then, the target element and its associated anchors may be recorded as a command in a script that is used to automate a repetitive task. As such, given a user interface and a script command consisting of a target element and the associated anchors, the present embodiment may automatically locate the target element in the user interface. The algorithm to generate such an agnostic script command is explained in further detail below with respect to FIG. 4.

Figure 4:
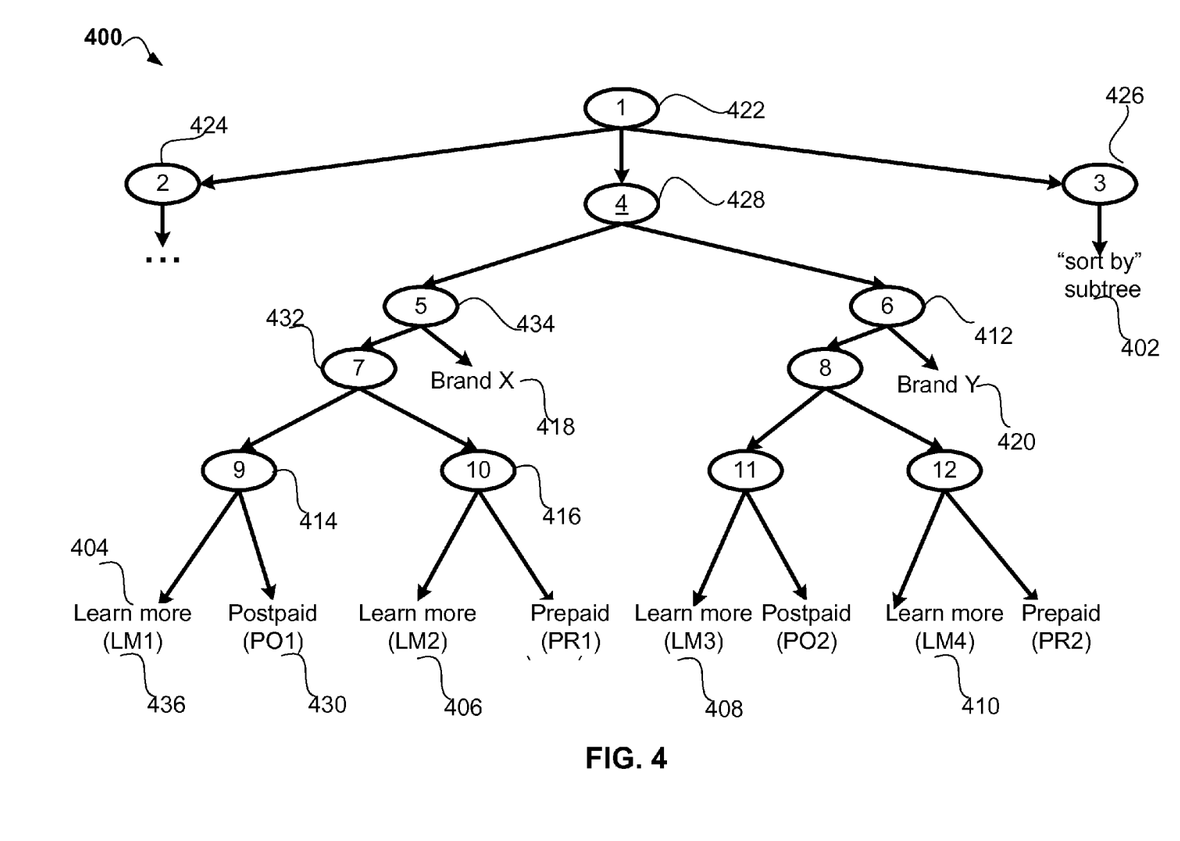
FIG. 4 illustrates a partial document object model (DOM) structure according to at least one embodiment.

Referring now to FIG. 4, an example illustrating a partial DOM structure according to at least one embodiment is depicted. The partial DOM structure correlates to the screenshot depicted in FIG. 3 referenced above. Given a target UI element (i.e., "e"), the automation phase (i.e., the automation engine 204 (FIG. 2)) may first create a label to refer to "e". For some types of UI elements, such as buttons or links, the text values inside those elements may serve as the labels. For other types of UI elements, such as text boxes, combo boxes, or radio buttons, such text values do not exist. In such cases, the types of those elements (i.e., "TextBox," "ComboBox," etc.) serve as the labels. If the initial label is unique, the technique may not need to identify any anchors. The initial label, by itself, may be sufficient to locate "e" unambiguously. However, if the label is not unique, the technique may have to compute the anchors for "e". The algorithm for computing the anchors may work on the DOM representation of a webpage as depicted in FIG. 4. FIG. 4 shows a partial DOM for the screenshot of FIG. 3. As shown, the root node 1 (422) has three children, nodes 2-4 (424-428): the second child, node 4 (428), includes the elements in containers of "Brand X" (418) and "Brand Y" (420); the third child, node 3 (426), includes the subtree 402 for the "Sort by" form. For brevity, the intermediate nodes that are not relevant have been omitted for explaining the algorithm. The algorithm may take as input the target label (li) (i.e., the initial label for the target UI element) and may compute the anchors required for identifying "li" uniquely. For example, suppose the target is the LM1 (436) instance of "Learn more" (404) in the DOM shown in FIG. 4. There are three other instances of the label, denoted LM2 (406), LM3 (408), and LM4 (410). Intuitively, the algorithm may proceed as follows. It may identify the largest subtree in which the target label is unique, and the largest subtrees that contain the other ambiguous instances but not the target. For the "Learn more" labels, these subtrees are t9 (414), t10 (416), and t6 (412). (For purposes of this example, the notation "tn" is used to refer to the DOM subtree rooted at node "n".) As such, t9 (414) and t10 (416) are the subtrees for LM1 (436) and LM2 (406), respectively, whereas t6 (412) is the subtree for LM3 (408) and LM4 (410). Next, the algorithm may attempt to find a label in t9 (414) that distinguishes it from t10 (416) and t6 (412). However, no such label exists. Therefore, the algorithm may pick the ambiguous subtree that is closest to t9 (414), which in this example, is t10 (416) and may identify a label in t9 (414) that at least distinguishes t9 (414) from t10 (416). "Postpaid" (430) is such a label in t9 (414), so the algorithm may select it. Since the algorithm has determined a way of distinguishing t9 (414) and t10 (416), it may navigate upward to their common ancestor, node 7 (432), and further expand the subtree to find the maximal subtree that does not include t6 (412), the remaining ambiguous subtree. In this example, this maximal subtree is t5 (434). At this point, the algorithm may search for a label in t5 (434) that distinguishes it from t6 (412), which it finds in the form of "Brand X" (418). Thus, "Postpaid" (430) and "Brand X" (418) may be identified as the anchors for LM1 (436).

Additionally, the playback phase (i.e., the playback engine 208 (FIG. 2)) executes the actions in an automated test script. The main task for this phase is to locate the target label (li), using the anchors recorded in the test script. The key idea of playback is to refine subtrees iteratively using anchors. In a sense, this phase may perform the reverse of what the automation phase does. As such, the automation phase may expand subtrees, starting from the subtree that contains "li", to collect anchors. However, the playback phase may start with the entire DOM tree and prune out subtrees, using the anchors, to narrow down to the subtree that contains "li". Intuitively, the playback phase may attempt to find the smallest subtree that includes "li" and all anchors (e.g., $a_1$; $a_2$; : : : ; $a_k$). Once such a subtree is identified, it may discard the last anchor "$a_k$" since that anchor may have served its purpose of focusing the search to a specific subtree. Next, within that subtree, the playback phase may find the smallest subtree that contains "li" and the anchors $a_1$; $a_2$; : : : ; $a_{k-1}$. It may continue in this manner, narrowing the search space and discarding an anchor in each iteration, until it finds a subtree in which "li" is unique. For this example with respect to FIG. 4, the technique may first identify t5 (434) as the smallest subtree that contains "li" ("Learn more") (404) and the two anchors ("Postpaid" (430) and "Brand X" (418)). Next, it may discard "Brand X" (418) and search within t5 (434) for the smallest subtree containing "Learn more" (404) and "Postpaid" (430). At this step, the method may narrow down to t9 (414), in which "Learn more" (404) is unique. Thus, it may locate LM1 (436) as the target label.

Figure 5:
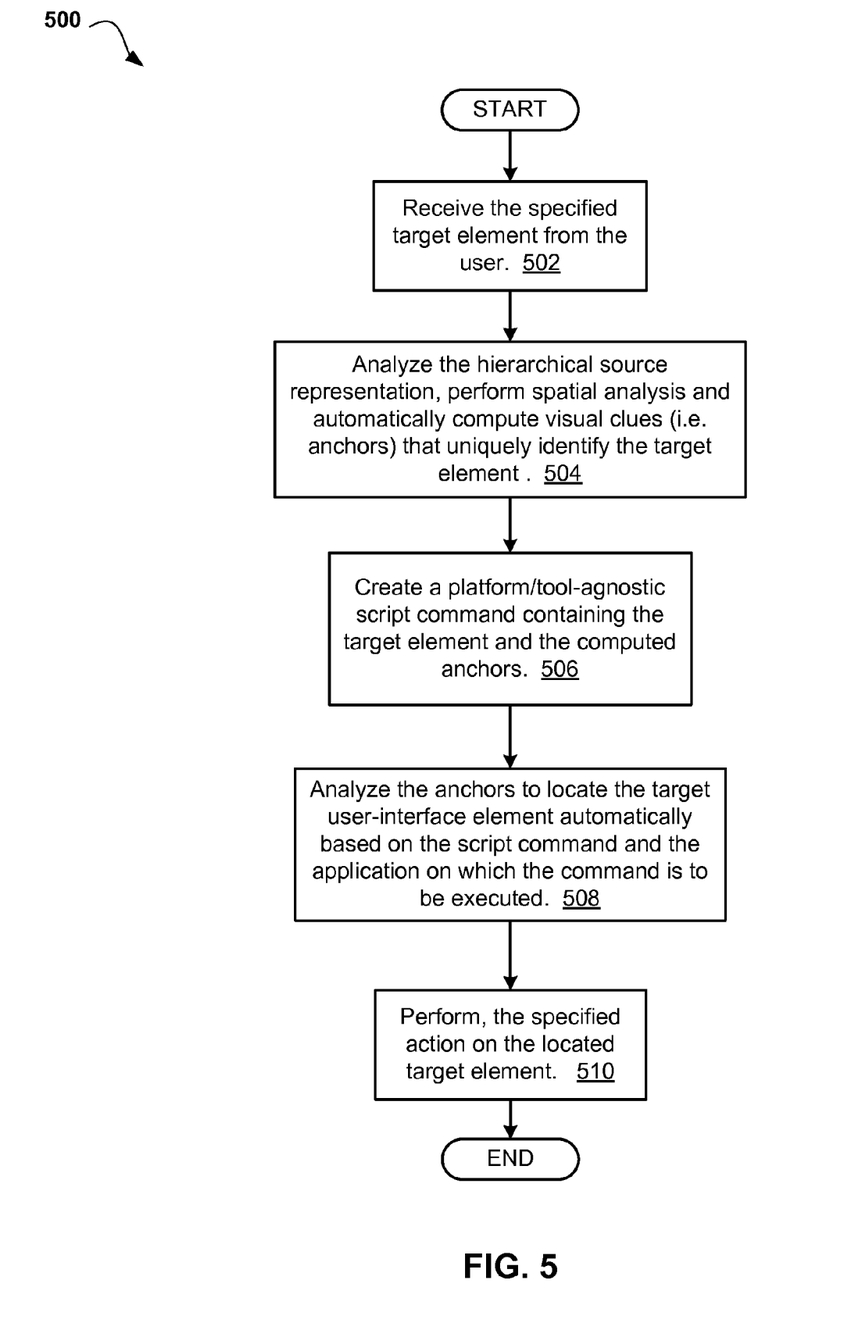
FIG. 5 is an operational flowchart illustrating the steps carried out by a program for creating change-resilient scripts according to at least one embodiment.

Referring now to FIG. 5, an operational flowchart illustrating the steps carried out by a program for creating a change-resilient script according to at least one embodiment is depicted. For example, the change-resilient script creator program 108A, 108B (FIG. 1) may be implemented as running on a client computer 102 (FIG. 1) or server computer 112 (FIG. 1). A user using client computer 102 (FIG. 1) or server computer 112 (FIG. 1) may execute the change-resilient script creator program 108A, 108B (FIG. 1). According to at least one implementation of the present embodiment, a change-resilient script (i.e., agnostic test automation script commands) associated with a specified action (e.g. "click on X") and a user interface (UI) may be created utilizing a two-phase process. The two-phase process may consist of an automation phase and a playback phase. The automation phase may include generating a test script in the form of a sequence of actions performed on UI elements, where each UI element is represented by a label. The automation phase may capture sufficient visual clues on the webpage to identify a label unambiguously during playback. Additionally, the playback phase may identify the label of interest using visual clues. If the label itself represents the UI element, the desired action is performed. Otherwise, if the label itself does not represent the UI element, then the playback phase may identify the UI element based on the proximity to the label and may perform the desired action on the element. The implementation for creating a change-resilient script is described in more detail below.

With respect to FIG. 5 at 502, a user-specified target element (i.e., a user interface (UI) element) that is associated with a specified action is received. For example, the target element may be a button, a link, a text box, a combo box, or a menu item which may be manipulated in a test step and therefore, is associated with a specified action.

Next, at 504, the hierarchical source representation may be analyzed; spatial analysis may be performed and visual clues (i.e. anchors), such as a text label or an image on the user interface that uniquely identify the target element may be generated. As such, once given the user-specified target element, the automation engine 204 (FIG. 2) may perform the hierarchical source representation. The hierarchical source representation may indicate the graphical user interface (GUI) model, such as whether the web page may be a DOM, a view tree or an equivalent GUI model for other GUI systems. Additionally, the automation engine 204 (FIG. 2) may perform spatial analysis. As such, the spatial relations between the target element and the visual clues (i.e., anchors) may be analyzed. For example, the target element and an associated anchor may not have any assumed relation other than the target element and the associated anchor may be spatially close. Therefore, the target element may be identified based on the target element's proximity to the anchor. Then, the automation engine 204 (FIG. 2) may automatically generate the visual clues (i.e., anchors) that uniquely identify the target elements that are ambiguous. For example, the automation engine 204 (FIG. 2) may generate at least one anchor uniquely identifying the ambiguous target element based upon the analyzing of the hierarchical source representation associated with the user interface (UI). As previously described, the anchor may be a text label or an image on the user interface (UI) that uniquely identifies the target element. Furthermore, the system may generate as many anchors as necessary to uniquely and unambiguously identify the target elements.

Then, at 506 the automation engine 204 (FIG. 2) may generate a platform or tool-agnostic script command (i.e., an agnostic test automation script command) that may be based upon the target element and the generated anchors. As such, the agnostic test automation script command may not contain any platform or tool-specific information. The agnostic test automation script command may contain the text label or image of the target element and the anchors. However, the agnostic test automation script command may not contain any data about the hierarchical source representation of the user interface including the internal attributes of the user interface elements from which the anchors may have been generated or the spatial relations between the target element and the generated anchors. Therefore, the created agnostic test automation script command may be independent of a specific tool and independent of a specific platform. As such, the created agnostic test automation script command may be a step in a test script that is executed in an application under test and drives the application under test via a user interface (UI) associated with the application under test.

Next, at 508 the anchors may be analyzed by the playback engine 208 (FIG. 2) to locate the target user interface element automatically based on the script command (i.e., the agnostic test automation script command) and the application on which the command may be executed. Therefore, the playback engine 208 (FIG. 2) may analyze, using the generated agnostic test automation script command, the at least one generated anchor to locate the target element within the user interface (UI), wherein the analyzing is based on an application on which the agnostic test automation script command is to be executed. As such, the script may be executed on different platforms and browsers with automatic adaptation. At 510, the specified action on the located target element may be performed using the generated agnostic test automation script command.

There may be various benefits of utilizing metadata-free test scripts, such as resiliency in the presence of changes in metadata or changes in locations of UI elements. Additionally, there may be seamless test execution across different browsers. For example, a test may be automated on Internet Explorer (Internet Explorer and all Internet Explorer-based trademarks and logos are trademarks or registered trademarks of Microsoft and/or its affiliates) and played back on Firefox (Firefox and all Firefox-based trademarks and logos are trademarks or registered trademarks of Mozilla and/or its affiliates). Similarly, there may be easy porting of scripts across testing tools. For example, a test may be automated using Quick Test Professional Tool (QTP) on Internet Explorer (Internet Explorer and all Internet Explorer-based trademarks and logos are trademarks or registered trademarks of Microsoft and/or its affiliates) and may be played back using an open-source software, on other browsers, such as Chrome (Chrome and all Chrome-based trademarks and logos are trademarks or registered trademarks of Google and/or its affiliates) and Safari (Safari and all Safari-based trademarks and logos are trademarks or registered trademarks of Apple and/or its affiliates). Additionally, for mobile application testing, where the large diversity of platforms, devices, etc. may make test automation difficult, metadata-free test scripts may offer significant advantages of seamless test execution across various platforms, devices, browsers, and application variants.

Figure 6:
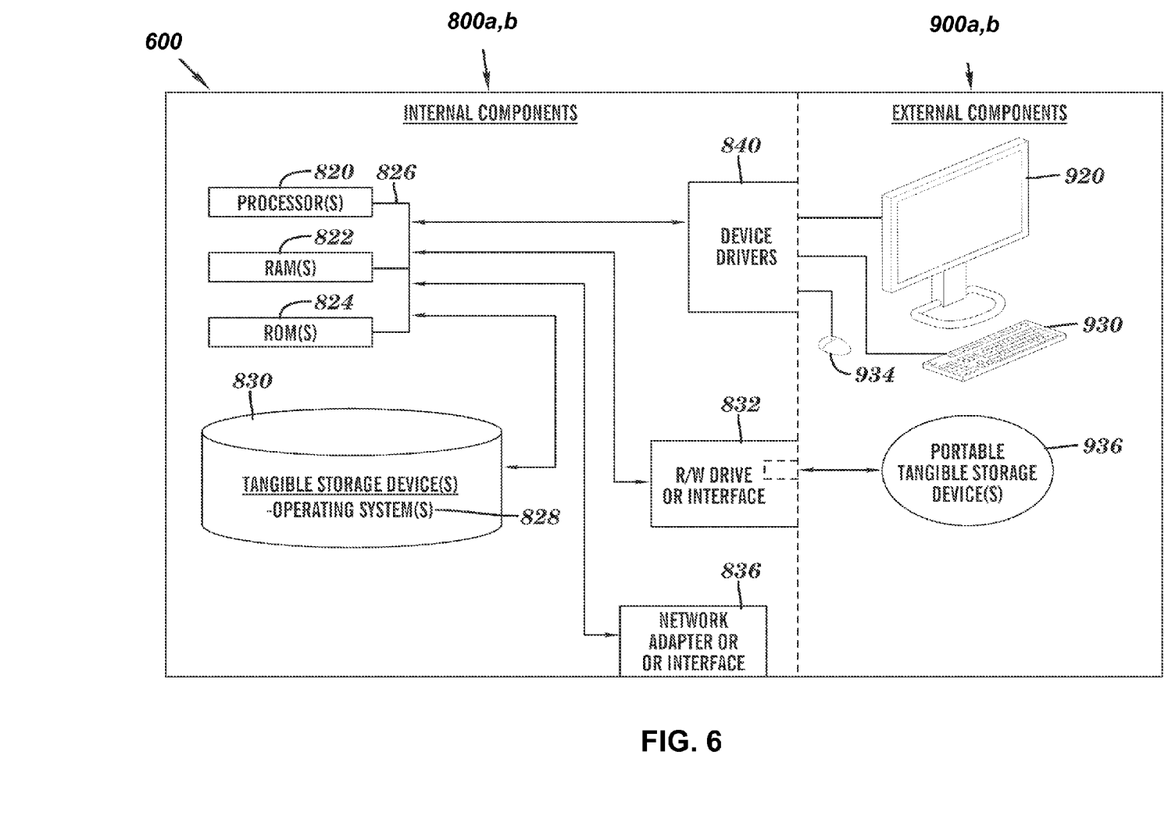
FIG. 6 is a block diagram of internal and external components of computers and servers depicted in FIG. 1 according to at least one embodiment.

FIG. 6 is a block diagram of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 800a, b and external components 900a, b illustrated in FIG. 6. Each of the sets of internal components 800a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and change-resilient script creator program 108A (FIG. 1) in client computer 102 and change-resilient script creator program 108B in network server computer 112 are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as change-resilient script creator program 108A and 108B, can be stored on one or more of the respective portable computer-readable tangible storage devices 936, read via the respective R/W drive or interface 832 and loaded into the respective hard drive 830.

Each set of internal components 800a, b also includes network adapters or interfaces 836 such as a TCP/IP adapter cards, wireless Wi-Fi interface cards, or 3G or 4G wireless interface cards or other wired or wireless communication links. The change-resilient script creator program 108A in client computer 102 and change-resilient script creator program 108B in network server 112 can be downloaded to client computer 102 from an external computer via a network (for example, the Internet, a local area network or other, wide area network) and respective network adapters or interfaces 836. From the network adapters or interfaces 836, the change-resilient script creator program 108A in client computer 102 and the change-resilient script creator program 108B in network server computer 112 are loaded into the respective hard drive 830. The network may comprise copper wires, optical fibers, wireless transmission, routers, firewalls, switches, gateway computers and/or edge servers.

Each of the sets of external components 900a, b can include a computer display monitor 920, a keyboard 930, and a computer mouse 934. External components 900a, b can also include touch screens, virtual keyboards, touch pads, pointing devices, and other human interface devices. Each of the sets of internal components 800a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for creating agnostic test automation script commands associated with a specified action and a user interface (UI), the method comprising:
   receiving a target element associated with the specified action;
   generating at least one anchor uniquely identifying the target element, wherein the target element is ambiguous and spatial analysis between the identified target element and a plurality of visual clues is used to generate the at least one anchor;
   generating an agnostic test automation script command based on the received target element and the at least one generated anchor, wherein the generated agnostic test automation script is meta-data free and non-platform specific; and
   analyzing, using the generated agnostic test automation script command, the at least one generated anchor to locate the target element within the user interface (UI), wherein the analyzing is based on an application on which the agnostic test automation script command is to be executed;
   performing, using the generated agnostic test automation script command, the specified action on the located target element.

2. The method of claim 1, wherein the generated anchor comprises:
   analyzing a hierarchical source representation associated with the user interface (UI); and
   analyzing at least one spatial relation between the target element and the at least one anchor on the user interface (UI).

3. The method of claim 1, wherein the target element comprises a user interface (UI) element.

4. The method of claim 1, wherein the anchor comprises at least one of a text label and an image on a user interface (UI).

5. The method of claim 1, wherein the created agnostic test automation script command does not contain a hierarchical source representation associated with the user interface (UI) and does not contain a spatial relation between the target element and the at least one anchor on the user interface (UI).

6. The method of claim 1, wherein the created agnostic test automation script command is independent of a specific tool and independent of a specific platform.

7. The method of claim 1, wherein the created agnostic test automation script commands comprise a step in a test script that is executed in an application under test and drives the application under test via a user interface (UI) associated with the application under test.

* * * * *